United States Patent
Breuer et al.

(10) Patent No.: US 7,614,220 B2
(45) Date of Patent: Nov. 10, 2009

(54) PROCEDURE FOR CONTROLLING THE REDUCING AGENT IN AN EXHAUST GAS POST-PROCESSING SYSTEM

(75) Inventors: Norbert Breuer, Ditzingen (DE); Andreas Genssle, Musberg (DE); Frank Ilgner, Stuttgart (DE); Peter Riegger, Stuttgart (DE); Markus Gloeckle, Stuttgart (DE); Ralf Wegst, Gaggenau (DE); Thorsten Raatz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/599,898

(22) Filed: Nov. 14, 2006

(65) Prior Publication Data

US 2007/0144150 A1 Jun. 28, 2007

(30) Foreign Application Priority Data

| Nov. 14, 2005 | (DE) | ......................... 10 2005 054 129 |
| Dec. 27, 2005 | (DE) | ......................... 10 2005 062 556 |
| Apr. 24, 2006 | (DE) | ......................... 10 2006 018 955 |
| May 4, 2006 | (DE) | ......................... 10 2006 020 693 |
| May 9, 2006 | (DE) | ......................... 10 2006 021 490 |
| May 11, 2006 | (DE) | ......................... 10 2006 021 987 |
| May 12, 2006 | (DE) | ......................... 10 2006 022 385 |
| May 17, 2006 | (DE) | ......................... 10 2006 022 992 |
| May 18, 2006 | (DE) | ......................... 10 2006 023 338 |
| Sep. 14, 2006 | (DE) | ......................... 10 2006 043 100 |

(51) Int. Cl.
*F01N 3/00* (2006.01)
(52) U.S. Cl. ............................ 60/295; 60/274; 60/286; 60/301; 60/303
(58) Field of Classification Search .................. 60/274, 60/286, 295, 301, 303
See application file for complete search history.

(56) References Cited

U.S. PATENT DOCUMENTS

2006/0101809 A1* 5/2006 Bodo et al. .................... 60/286

FOREIGN PATENT DOCUMENTS

DE 199 22 961 A1 11/2000
(Continued)

OTHER PUBLICATIONS

Werner Weisweiler, "Elimination of Nitrogen Oxides from Oxygen-Containing Automotive Exhaust Gases", Chemistry Engineer Technology, vol. 72, Issue 5, pp. 441-449, 2000.

*Primary Examiner*—Thomas E Denion
*Assistant Examiner*—Diem Tran
(74) *Attorney, Agent, or Firm*—Merchant & Gould P.C.

(57) ABSTRACT

The invention relates to a procedure for controlling the reducing agent in an exhaust gas post-processing system of a combustion machine with an exhaust gas duct, in which an SCR catalytic converter is provided in the direction of flow of the exhaust, wherein a reducing agent generation system has an $NO_x$ and $CO/H_2$ generation unit,, an oxidation catalytic converter and a combined $NO_x$ storage / ammonia generation unit in the standard gas route of the reducing agent generation system, and, in order to reduce nitrogen oxide, ammonia is added as a reducing agent in front of the SCR catalytic converter by the reducing agent generation system, wherein source materials for the generation of ammonia are at least intermittently added to the $NO_x$ and $CO/H_2$ generation unit via a fuel supply line and via an air supply line, wherein during the fat phase the air/fuel composition is changed in front of the oxidation catalytic converter in the form of a lambda modulation for a lambda value. It can thus be achieved that, in pulse mode, a high $H_2/CO$ yield can be achieved with a simultaneously low HC slip and the higher HC penetrations associated with the natural aging of the catalytic converter and the decreasing $H_2/CO$ yields are compensated. Influences resulting from the reactor geometry of the oxidation catalytic converter can be influences or compensated with the procedure in terms of its drive-away characteristic.

11 Claims, 2 Drawing Sheets

FOREIGN PATENT DOCUMENTS

| | | |
|---|---|---|
| DE | 101 39 142 A1 | 2/2003 |
| DE | 103 37 901 | 3/2005 |
| GB | 2375059 * | 11/2002 |
| WO | WO 01/14702 A1 | 3/2001 |
| WO | WO2004/071646 | 8/2004 |

* cited by examiner

PROCEDURE FOR CONTROLLING THE REDUCING AGENT IN AN EXHAUST GAS POST-PROCESSING SYSTEM

The invention relates to a procedure for controlling the reducing agent in an exhaust gas post-processing system of a combustion machine with an exhaust gas duct, in which an SCR catalytic converter is provided in the direction of flow of the exhaust, wherein a reducing agent generation system (RGS) has an $NO_x$ and $CO/H_2$ generation unit, an oxidation catalytic converter ($cPO_x$) and a combined $NO_x$ storage / ammonia generation unit (AGC) in the standard gas route of the reducing agent generation system, and, in order to reduce nitrogen oxide, ammonia is added as a reducing agent in front of the SCR catalytic converter by the reducing agent generation system, wherein source materials for the generation of ammonia are at least intermittently added to the $NO_x$ and $CO/H_2$ generation unit via a fuel supply line and via an air supply line.

For the reduction of nitrogen oxide in the exhaust gas of leanly operated engines, $NO_x$ storage catalytic converters can be used, which are also called $NO_x$ storage reduction catalytic converters or NSC. These $NO_x$ storage catalytic converters work discontinuously in a mode consisting of two phases: in the first, longer phase, the so called lean phase (lambda>1), the nitrogen oxides of the engine contained in the exhaust gas are stored. In the second, shorter phase, the so-called fat phase (lambda<1), the stored nitrogen oxide is regenerated by means of a fat exhaust gas created inside the engine. During the regeneration only nitrogen ($N_2$), water ($H_2O$) and carbon dioxide ($CO_2$) are created from the stored nitrogen oxides during the conventional operating mode of an NSC.

It is generally known that, in the case of unfavorable regeneration conditions, such as with very long regenerations and/or small lambda values ($\lambda \approx 0.8$), a smaller part of the stored $NO_2$ can more likely be converted to ammonia ($NH_3$). However, in this case, the $NH_3$ formation is an undesired parasitic effect.

A corresponding exhaust gas post-processing is required in connection with future, legal requirements with regards to nitrogen oxide emissions from vehicles. The selective catalytic reduction (SCR) can be used to reduce the $NO_x$ emissions in combustion engines, in particular in diesel engines, with temporally mainly lean, i.e. oxygen-rich, exhaust gas. A defined amount of a selectively acting reducing agent is hereby added to the exhaust gas. This can, for example, be in the form of ammonia, which is added directly as a gas, or is also obtained from a precursor substance in the form of urea or from a urea/water solution (HWL). These types of HWL/SCR systems were first used in the commercial vehicle industry.

DE 10139142 A1 describes an exhaust gas cleaning system of a combustion machine, in which an SCR catalytic converter, which reduces the nitrogen oxides contained in the exhaust gas with the reducing agent ammonia to nitrogen, is used to reduce the $NO_x$ emission. The ammonia is obtained from the urea-water solution (HWL) in a hydrolysis catalytic converter arranged upstream from the SCR catalytic converter. The hydrolysis catalytic converter converts the urea contained in the HWL into ammonia and carbon dioxide. In a second step, the ammonia reduces the nitrogen oxide to nitrogen, wherein water is created as a byproduct. The exact processing sequence is sufficiently described in the technical literature (see WEISSWELLER in CIT (72), page 441-449, 2000). The HWL is prepared in a reagent tank.

The disadvantage of this procedure is that HWL is used during the operation of the combustion machine. The usage is thereby approx. 4% of the fuel consumption. The supply of the urea-water solution would have to be ensured in a correspondingly extensive manner, at gas stations for example. Another disadvantage of the procedure is the necessary operating temperature range. The hydrolysis reaction of the urea-water solution first occurs quantitatively at temperatures of 200° C. at the hydrolysis catalytic converter upon release of the ammonia. These temperatures in the exhaust gas of diesel engines, for example, are first achieved after longer periods of operation. Based on depositions, temperatures below 200° C. can lead to blockages in the dosing unit, which at least prevents the urea-water solution from getting into the exhaust tract. Furthermore, based on polymerization, the addition of the urea-water solution at temperatures below 200° C. can lead to the blocking of the necessary catalytic properties at the hydrolysis catalytic converter or at the SCR catalytic converter.

DE 199 22 961 C2 describes an exhaust gas cleaning system for cleaning the exhaust gas of a combustion source, in particular a vehicle's combustion engine, at least of therein-contained nitrogen oxides with an ammonia generating catalyst for the generation of ammonia using components of at least part of the exhaust gas emitted from the combustion source while ammonia generating operating stages and a nitrogen oxide reduction catalytic converter located downstream from the ammonia generation catalytic converter for the reduction of nitrogen oxides contained in the emitted exhaust gas of the combustion source using the created ammonia as the reducing agent. A combustion source external to the nitrogen oxide generation unit for the enrichment of the exhaust gas supplied to the ammonia generating catalyst is provided with nitrogen oxide created by it during the ammonia generating operating phases. A plasma generator for the plasma-technical oxidation of nitrogen contained in a supplied gas flow into nitrogen oxide is suggested as the nitrogen oxide generating unit. The hydrogen required for ammonia generation is created during the ammonia generating operating phases through the operation of the combustion source with a fat, i.e. fuel-rich, air ratio.

The disadvantage of this procedure is the relatively high fuel consumption during the necessary fat operating phases. Furthermore, a high energy demand for the supply of the nitrogen oxide to the external engine is required, in particular since nitrogen oxide must be created in a high concentration during the shortest possible ammonia generating operating phases and the remaining oxygen must be removed in an energy consuming manner for the generation of ammonia. If the hydrogen is created via a $PO_x$ catalytic converter through a partial oxidation reformation ($PO_x$), another disadvantage is the hitherto low dynamics of the hydrogen generation.

A plasma-chemical procedure for the generation of a hydrogen-rich gas mixture is described in WO 01/14702 A1. A fat fuel/air mixture, preferably under $PO_x$ conditions, is thereby treated in an electrical arc.

In order to avoid the entrainment of another operating material, a hitherto unpublished document by the applicant suggests a plasma procedure for the on-board generation of reducing agents. The ammonia necessary for the reduction of the nitrogen oxide is thereby created from nontoxic substances in the vehicle and is subsequently added to the SCR process. An acceptable solution with respect to fuel consumption is provided by a discontinuously operated procedure for ammonia generation, as is also suggested this document. This procedure is described below as the RGS method (Reductant Generating System) or reducing agent generating system.

An important component of an RGS unit is a catalytic converter, which works according to the discontinuous basic principle of an $NO_x$ storage catalytic converter (NSC), but is operated such that the nitrogen oxides stored in the lean phase are converted in a targeted manner into ammonia and not into nitrogen during the fat reduction phase. The nitrogen oxides are created in a nitrogen oxide generation unit under lean conditions from e.g. air, which is combined with a hydrogen/carbon monoxide generating unit into an $NO_x$ and $CO/H_2$ generation unit. This $CO/H_2$ generation unit is also called a reducing agent generation unit. The gas mixture leaves it in the fat phases is primarily made up of $H_2$, CO and $N_2$ and is also called reformat gas. The ammonia created periodically (=cyclically) on an NSC is added to the engine exhaust tract and is converted into $N_2$ in the SCR catalytic converter located upstream with engine $NO_x$. This type of $NH_3$-maximized operated $NO_x$ storage catalytic converter will now be referred to as an AGC unit (AGC =ammonia generating catalyst).

The operating conditions of the AGC unit for the targeted ammonia creation outside the exhaust tract are strongly differentiated from that of a conventional NSC in the full exhaust stream. The main differences are:

An approx. 10 to 20 times greater $NO_x$ (up to 1%) and $H_2$/CO concentration (in total up to 40%)

A standard, clearly higher global $NO_x$ depletion density of the $NO_x$-storage catalytic converter (up to 2 g $NO_2$ per liter AGC volume) and associates with this Strongly exothermal heat tinges via the catalyst length of the AGC unit with positive temperature gradients $\Delta T$ of over 100° C.

The ammonia yield in the AGC unit depends on the temperature control at the AGC unit or the temperature profile via the length of the AGC unit, on the duration of the fat phase, on the concentration of the reducing agents as well as on the catalyst formulation. The cyclical operating mode of the AGC unit, consisting of a longer oxygen-rich, lean $NO_x$ depletion phase and a short, under-stoichiometric in terms of oxygen, operated and thus fat regeneration phase, requires the intermittent (pulsed) supply of the reducing agent, here the reformat or reformat gas. This is generally possible. However, the pulsed supply of the reformat, in particular in the case of the high required purity of the reformat, places very high demands on the activity of the catalyst with respect to the target products $H_2$ and $CO_2$ since the reformat is not taken from an interim storage, but rather must be created for a period of just a few, typically 2 to 10, seconds directly at the catalytic converter from the reactants fuel (e.g. diesel or gasoline) and air. While low remaining hydrocarbon levels (HC) can be achieved at high $CO/H_2$ levels in the continuous operation (stroke mode) of this type of reformat-providing catalytic converter (catalytic partial oxidation level, cPOx stage, also referred to as an oxidation catalytic converter) as a result of the high exothermia and thus high catalytic converter temperatures in the case of the under-stoichiometric ($\lambda$=0.35) conversion of air with fuel to the desired $CO/H_2$ mixture, the catalytic converter temperatures in pulse mode are much lower due to heat loss and/or as a result of special operating methods, e.g. continuous flow of cold air through the catalytic converter. Additionally, the geometry of the cPOx reactor can have a negative effect on the drive-away characteristics in this phase.

Thus, the object of the invention is to provide a procedure for an optimized operating method for the $cPO_x$ stage, in which high $H_2$/CO levels and a minimum HC slip, in particular in the pulse mode, can be achieved. It is also the object of the invention to optimally influence with the procedure the drive-away characteristics of the cPOx stage depending on the reactor geometry or to compensate for the negative effects resulting from the reactor geometry.

The object of the invention is thus solved in that a $CO/H_2$ reducing agent flow is temporally modulated with $\lambda<1$, during a temporally short, pulsed fat phase serving as a reduction phase for the NOx storage/ammonia generation unit, wherein, during the fat phase, the air/fuel composition before the oxidation catalytic converter (cPOx) is changed to the form of a lambda modulation for a lambda value. This type of temporally changeable air/fuel composition or air/burner exhaust/fuel composition is also called lambda sweep below. Thus, on one hand, the HC emissions behavior and the $H_2$/CO yield in the pulsed mode of a cPOx stage can thus be advantageously influenced during the course of the $H_2$/CO preparation phase. In particular, in pulse mode, in the case of system-determined, low catalytic converter temperatures, high $H_2$/CO levels at simultaneously low HC slip. On the other hand, it has been shown that the higher HC penetrations determined through "natural" aging of the catalytic converter and the decreasing $H_2$/CO levels over the life time are at least partially compensated. Furthermore, with the lambda modulation, the catalytic converter temperatures can be increased or decreased in a targeted manner.

Procedure variants provide that the lambda modulation is realized within the fat phase through a variation of a fuel substance flow with constant air flow or through variation of the air substance flow with constant fuel substance flow or a combination of both options, wherein it is particularly advantageous to vary the fuel substance flow for the lambda modulation, since the highest possible dynamic is hereby achieved and the lambda modulation can thus be directly stamped on the oxidation catalytic converter (cPOx).

The drive-away characteristic or the "run-up" characteristic of the catalytic converter coupled with the reactor geometry, in particular the geometry of the air/fuel mixture zone, can be positively affected, if the lambda value within the pulsed fat phase is held within the range of 0.33 through 0.45 and, at the beginning of the fat phase of the lambda value drops below this range for a short period of time. This is advantageous in particular for reactor superstructures with a large pre-mixture volume, since such reactor geometries for conventionally named "lean drive-away losses" have at the beginning of the fat pulse as a result of their specific mixture formation characteristic coupled with the dead-time behavior mixture formation zone, which can be compensated with this "fat" lambda sweep.

Decreased $H_2$/CO levels right at the beginning of the fat phase can thus be avoided in particular, if the lambda value is reduced to $\lambda \leq 0.3$ at the beginning of the fat phase.

Conversely, superstructures with only a low fuel/air pre-mixture volume as a result of local fuel/air inhomogeneities often have locally drive-away conditions that are too fatty and thus increased HC penetrations and/or a carbon formation at the beginning. Such undesired conditions can be efficiently counter-acted if the lambda value within the pulsed fat phase is held within a range of 0.33 to 0.45 and is increased above this for a short period of time at the beginning of the fat phase of the lambda value.

It has proven to be particularly efficient if the lambda value is increased to a value in the range of $0.7 \leq \lambda \leq 0.9$ (typically approx. 0.8) at the beginning of the fat phase. Through this "lean" lambda sweep, the catalytic converter temperatures can also be increased in a targeted manner and/or the HC emissions behavior and the $H_2$/CO yields can be influenced advantageously.

In both cases, it has proven to be sufficient if the fat phase is preceded by a phase with a lower or higher lambda value with respect to the specified lambda value in the fat phase for a maximum of 1 second.

If, during the pulsed fat phase, the lambda value for the oxidation catalytic converter (cPOx) can be varied according to need in a range from $0.3 \leq \lambda \leq 1$, the lambda modulation can be very flexibly adapted for different operating conditions or phases and/or for different reactor geometries, similar to the principle of the fuel-injection design of a common rail system, which also brings advantages with respect to the compensation of appearances of aging.

A variant of the procedure also provides that at the beginning and/or at the end of the pulsed fat phase, a rinsing of the oxidation catalytic converter (cPOx) with (heated) air and/or, in the case of operation with a separate burner, hot burner gas or a mixture of burner exhaust/air is performed. With this short, typically 1 to 10 second, pre- and/or post-phase, the catalytic converter temperature can be maintained at a high level despite the pulse mode, since long rinse phases between the individual fat pulses can be reduced to a minimum. The short advance phase primarily serves to temper the mixture formation zone, in order to improve the mixture formation during the subsequent fat pulse. The post phase does not rinse converted hydrocarbons out of the catalytic converter and oxidizes where applicable carbon deposits from the fat phase. Carbon deposits on the catalytic converter can thus be prevented.

When using a separate burner, the lambda modulation can also be realized in the burner/air/fuel system, wherein the pulsed operation of the oxidation catalytic converter (cPOx) including a preliminary mixture formation is performed when the fuel is added to the hot burner exhaust gas or a mixture made up of burner exhaust and air. Without an external burner, the inclusion of the fuel takes place in otherwise, e.g. electrically, preheated air. It is also possible to use a combination of both limit cases. This is particularly advantageous with respect to low fuel consumption in the vehicle.

With respect to the high precision and flexible adjustment for different operating conditions, it is particularly advantageous if the temporal modulation of the $CO/H_2$ reducing agent flow, the air volume and the fuel volume flow as well as the specification of the lambda value is realized by means of a control and regulation unit, wherein a corresponding valve control characteristic for fuel injection valves/injectors in the fuel duct and a corresponding performance characteristic for an air supply system for the air duct are specified by means of hardware and software components.

If the procedure used for diesel engines or lean engines, which have a reducing agent generation system (on-board ammonia generation), the nitrogen oxide load can thus be reduced significantly in particular at low exhaust gas temperatures, which is of importance in particular for diesel engines. However, the procedure in connection with the reducing agent generation system can also offer advantages with respect to the minimization of toxins for lean engines that are operated with normal or super grade fuel.

The invention is described in greater detail below using the exemplary embodiments illustrated in the figures.

Figure 1:
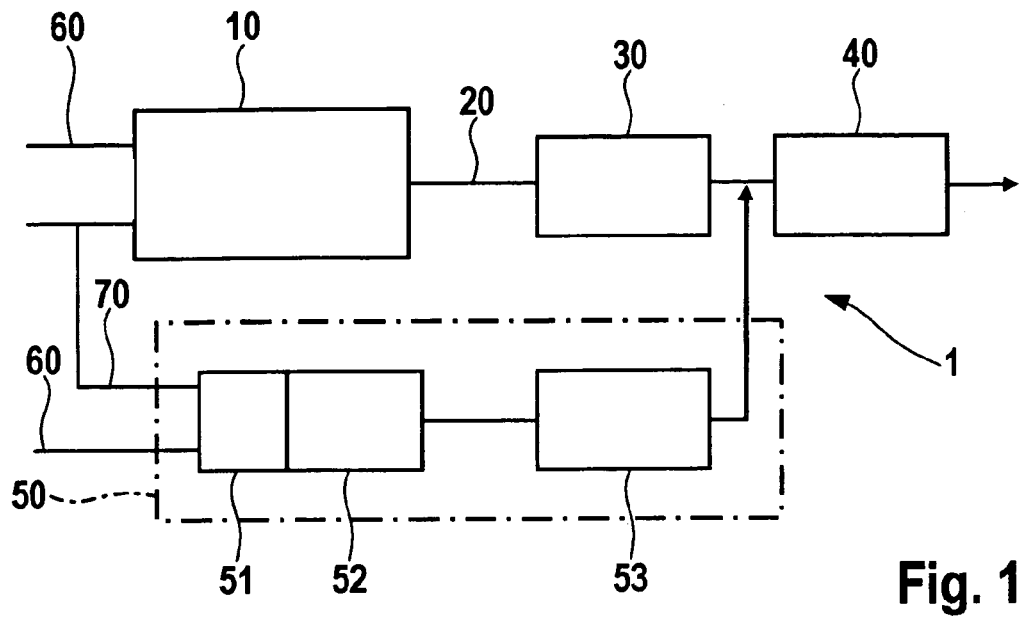
FIG. 1 shows a schematic representation of an exhaust gas post-processing system of a combustion machine with a reducing agent generation system.

FIG. 1 uses a diesel engine as an example to show schematically the technical environment in which the procedure according to the invention can be used.

An exhaust gas post-processing system 1 for a combustion machine 10 is shown, the exhaust gases of which are conveyed via an exhaust duct 20, wherein a diesel particle filter 20 (DPF) and a downstream SCR catalytic converter 40 are provided in the direction of flow. For the reduction of nitrogen oxides, ammonia can be added as the reducing agent in front of the SCR catalytic converter 40 by a reducing agent generation system 50 (RGS). SCR catalytic converters 40 thereby operate according to the principle of selective catalytic reduction, in which nitrogen oxide is reduced to nitrogen and water by means of the reducing agent ammonia in oxygen-containing exhaust gases.

The reducing agent generation system 50 has an $NO_x$ and $CO/H_2$ generation unit 51 in the direction of flow, which contains an oxidation catalytic converter 52 (cPOx) as well as a combined $NO_x$ storage/ammonia generation unit 53 (AGC unit). Source materials for the generation of the ammonia can be added at least intermittently to the $NO_x$ and $CO/H_2$ generation unit 51 via an air duct 70 and a fuel duct 60. The ammonia is generated from air, exhaust gas or a mixture of air and exhaust gas as well as from diesel fuel in the example shown. A hydrogen generation unit and a nitrogen oxide generation unit are provided for this. In the example shown, the $NO_x$ generation unit is designed as a plasma reactor, in which $NO_x$ is generated from air by means of a glow-discharge like process. In this example, the plasma reactor also contains the oxidation catalytic converter 52 (cPOx) located downstream from the $NO_x$ generation unit.

The generation of the ammonia takes place within the reducing agent generation system 50, in which nitrogen oxide $NO_x$ in a lean phase ($\lambda > 1$) is created from air in a plasma process within the plasma reactor. These nitrogen oxides flow through the subsequent oxidation catalytic converter and are subsequently added to a combined $NO_x$ storage / ammonia generation unit 53 and stored. In a second operating phase following the lean phase, the fat phase ($0.33 < \lambda < 1$), liquid fuel is added to the air in the area of the plasma reactor in an evaporation and mixture formation zone and is converted to a hydrogen and carbon-monoxide-containing gas mixture on the oxidation catalytic converter 52, which subsequently converts the previously stored nitrogen oxides into ammonia in the area of the $NO_x$ storage / ammonia generation unit 53. The created gaseous ammonia is then added to the exhaust gas flow of the exhaust gas duct 20 in front of the SCR catalytic converter 40.

Since the SCR catalytic converter 40 also has an ammonia storage capability, it is possible to achieve continuous reduction of the nitrogen oxides by means of the SCR process in the exhaust gas flow via a discontinuous procedure for ammonia generation. In the temperature range between 150° C. and 450° C., catalytic converters made of e.g. titanium oxide ($TiO_2$) and vanadium pentoxide ($V_2O_5$) thereby convert the nitrogen oxides with the generated ammonia with a high rate.

In order to be able to achieve high $H_2/CO$ levels and a minimum HC slip in particular in the pulse mode, the procedure according to the invention provides that, during the short, pulsed fat phase 90 serving as the reduction phase for the $NO_x$ storage/ammonia generation unit 53 with $\lambda < 1$, the air/fuel composition is temporally changed in front of the oxidation catalytic converter 52 (cPOx) into the form of a lambda modulation for a lambda value of 100. The lambda modulation within the fat phase 90 can be realized through the variation of the fuel volume flow at a constant air flow or through the variation of the air volume flow at a constant fuel volume flow or a combination of the two options.

In accordance with the invention, it is provided that the temporal modulation of the CO/$H_2$ reducing agent flow, the air volume and fuel volume flow as well as the specification of the lambda value 100 by means of a control and regulation unit, wherein a corresponding valve control characteristic for fuel injection valves/injectors in the fuel duct and a corresponding performance characteristic for an air supply system for the air duct are specified by means of hardware and software components.

As a general rule, the procedure can be used for all vehicles with diesel or lean engines, which are operated with other fuels, in which a reducing agent generation system 50 is used for on-board ammonia generation. The procedure according to the invention for the on-board reformat generation for an engine that operates on an $H_2$ gasoline mixture can also contribute to the optimization of the operating strategy or can be used to regenerate an NSC in the full exhaust gas stream.

Figure 2:
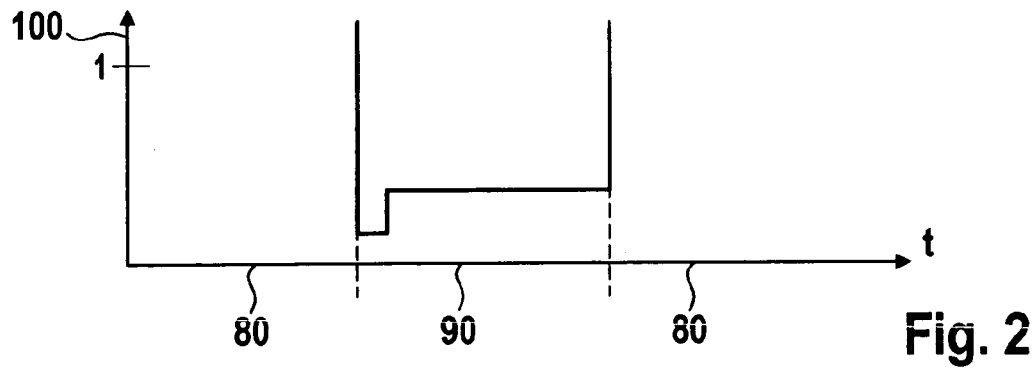
FIG. 2 shows an exemplary lambda progression in the oxidation catalytic converter (cPOx) in a "fat" lambda sweep.
Figure 3:
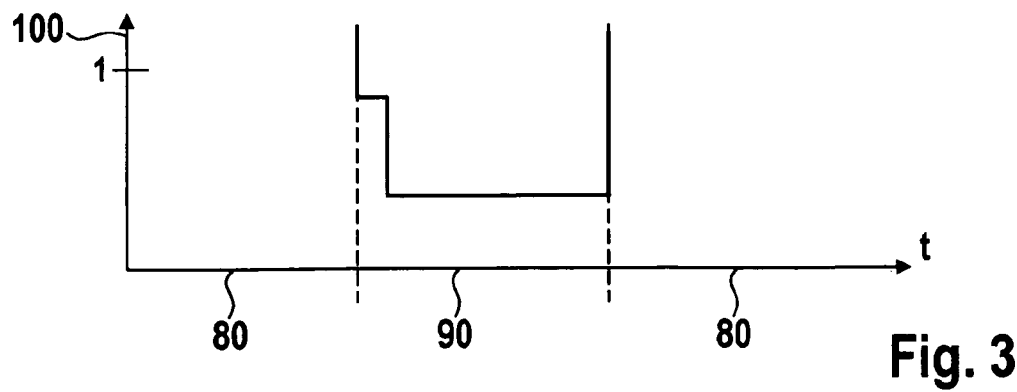
FIG. 3 shows another exemplary lambda progression in the oxidation catalytic converter (cPOx) in a "lean" lambda sweep.

The procedure is shown based on temporal progressions of the lambda value 100 (cPOx) shown in FIGS. 2 and 3.

FIG. 2 shows an example of a schematic representation of the temporal progression of the lambda value 100 during a "fat" lambda sweep. It is thereby representative that the lambda value 100 within the pulsed fat phase 90 is controlled between the lean phases 80, in the range of 0.33 to 0.45 and drops at the beginning of the fat phase 90 of the lambda value 100 for a short period within this range, typically to $\lambda \leq 0.3$.

In contrast, FIG. 3 shows a schematic representation of the temporal progression of the lambda value 100 during a "lean" lambda sweep. It is hereby typical that the lambda value 100 within the pulsed fat phase 90 is controlled in the range of 0.33 to 0.45 and is increased over this range for a short period of time at the beginning of the fat phase 90 of the lambda value 100, wherein lambda values 100 are set in the range of $0.7 \leq \lambda \leq 0.9$, preferably $\lambda \approx 0.8$, for this short phase.

The duration of this pre-fat phase 90 phase with a lower or higher lambda value 100 with respect to the specified lambda value 100 within the fat phase 90 is typically approx. 1 second.

Figure 4:
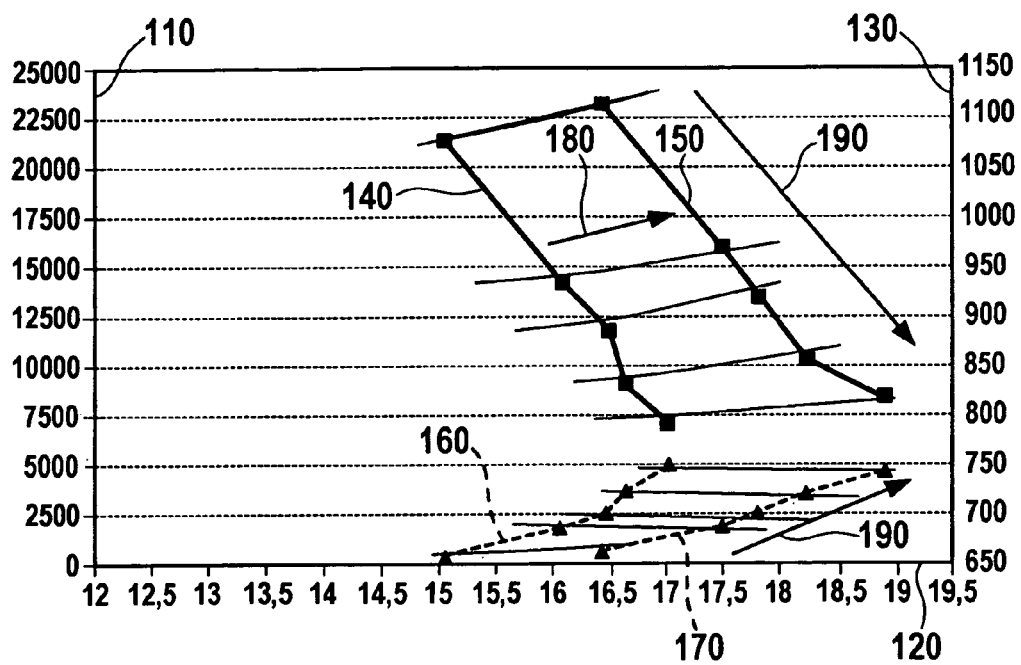
FIG. 4 shows a results diagram for a permanent lean variation with and without a "fat" lambda sweep.
Figure 5:
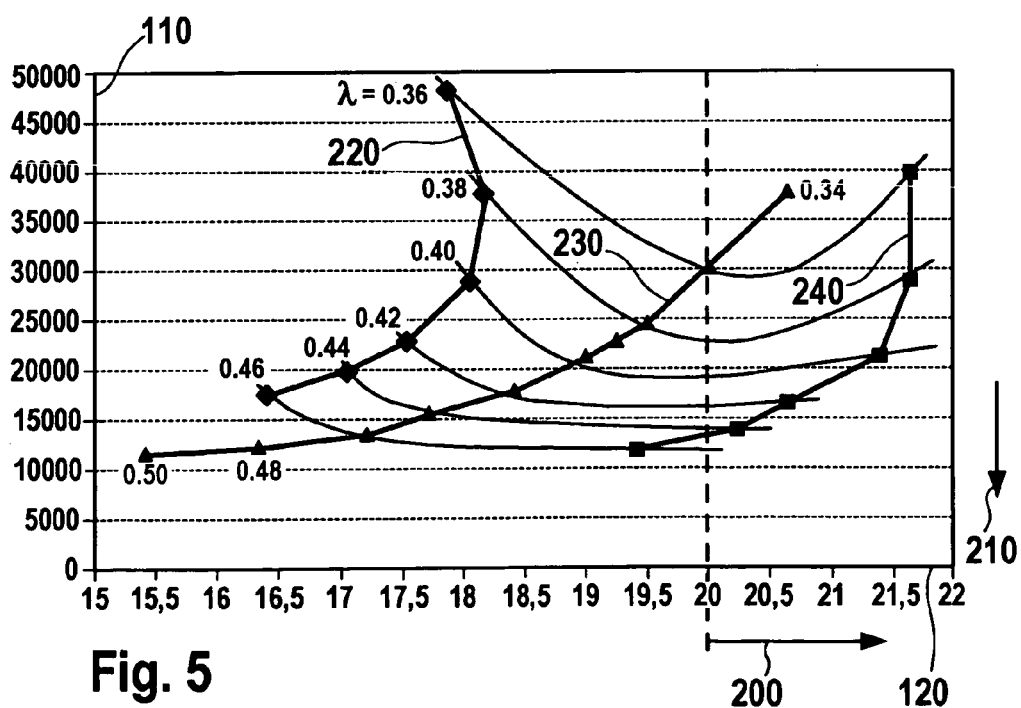
FIG. 5 shows a results diagram for different catalytic converter aging conditions and operating modes.

FIG. 4 and FIG. 5 show typical result diagrams for a lean duration variation with and without a "fat" lambda sweep as well as for different catalytic aging conditions and operating modes.

FIG. 4 shows an example of the improvement of the $H_2$ yields through compensation of lean drive-away losses of a fat pulse (3 seconds fat duration). On one hand, the diagram plots the average of the C1 concentration in the fat phase/ppm 110 and, on the other hand, a mean temperature as per cPOx/° C. 130 in direction y and the average of the $H_2$ concentration in the fat phase/% 120 in direction x. The C1 concentration is thereby the value that is measured with a sum FID (Flame Ionization Detector) for hydrocarbon detection (HC detection). It is equal to three times the quantity of the propane equivalent.

In the example shown, diesel fuel was injected into permanently flowing, preheated air for the duration of the fat pulse and the resulting mixture was given to the oxidation catalytic converter 52 (cPOx). The time, during which no diesel fuel was injected (lean phase 80), varies from 30 to 17.5 seconds (see "Lean duration decreasing" arrow 190). For the "with lambda sweep" operation mode, the progression for the value pair of the $H_2$/C1 concentrations is shown in curve 150, wherein the lambda value 100 was increased from 0.33 in the first second to 0.42 in seconds 2 and 3 of the fat phase. For the "without lambda sweep" operating mode, the progression for the value pair of the $H_2$/C1 concentrations is shown in curve 140, wherein the lambda value 100 was 0.42 during the entire fat phase 90 of 3 seconds. It should be noted that the lean drive-away losses determined by the "fat" lambda-sweep reactor geometry were compensated and the $H_2$ concentrations were able to be clearly increased (see "Displacement by lambda sweep" arrow 180).

Furthermore, the diagram shows the progression of a temperature as per cPOx without lambda sweep 160 and the progression of a temperature as per cPOx with lambda sweep 170 in the case of a decreasing lean duration (see "Lean duration decreasing" arrow 190) depending on the average $H_2$ concentration in the fat phase/% 120. With the "fat" lambda sweep, the catalytic temperature can be held virtually constant despite an increasing $H_2$ yield. This procedure is characteristic for a reactor structure with a large pre-mixture volume.

FIG. 5 shows an example of the compensation of signs of catalytic converter aging and/or the improvement of the $H_2$/CO yields as well as the decrease of HC penetrations for a fat pulse with a total duration of 6 seconds. The diagram plots the average of the C1 concentration in the fat phase/ppm 110 in direction y and the average of the $H_2$ concentration in the fat phase/% 120 in direction x.

In the example shown, diesel fuel was injected into permanently flowing, preheated air for the duration of the fat pulse and the resulting mixture with different lambda values 100 from 0.36 at the beginning to a maximum of 0.5 was given to an oxidation catalytic converter 52 (cPOx) in two aging states ("fresh" and "aged"). The time, during which no diesel fuel was injected (lean phase 80), was 30 seconds.

The concentration progression for an aged oxidation catalytic converter 220, the concentration progression for a fresh oxidation catalytic converter 230 (both without lambda sweep) as well as the concentration progression for the aged oxidation catalytic converter with an optimized operating mode with lambda sweep 240 (with "lean" lambda sweep here) are shown.

For the "without lambda sweep" operating mode, the lambda value 100 in the fat phase 90 was held constant according to the specified lambda values 100 for 5 seconds. In the "with lambda sweep" operating mode, the lambda value 100 was set to a value of 0.7 during the first second of the fat phase and was subsequently reduced to the aforementioned lower lambda values 100 for another 5 seconds of the lambda value 100. The specified $H_2$/C1 levels each refer to 5 seconds of "real" fat time in both modes, since practically no $H_2$/CO and hardly any HC emissions are created in the first second at $\lambda = 0.7$.

It should be noted that, as a result of signs of aging without lambda sweep, the $H_2$ yield is much lower than with a "fresh" oxidation catalytic converter 52 (cPOx). At the same time, a higher value is detector for the HC slip in the case of the same specified lambda value 100. In the optimized operating phase with "lean" lambda sweep, signs of aging can be compensated on the oxidation catalytic converter 52 (cPOx) and a high $H_2$/CO target concentration 200 is achieved with the same low HC target concentrations 210.

Overall, with the procedure shown and the variants of the procedure, a high $H_2$/CO yield can be achieved with the same low HC slip and the higher HC penetrations associated with the natural aging of the catalytic converter and the decreasing $H_2$/CO yields can be compensated. Effects with respect to the reactor geometry (e.g. pre-mixture volumes) of the oxidation catalytic converter 52 (cPOx) can be influenced or compensated with the procedure with respect to their drive-away characteristics.

As a general rule, the lambda progression (lambda modulation of the fat mimic) within the pulsed fat phase 90 or, more generally, during the operation of the oxidation of the catalytic converter 52 (cPOx), can vary freely within the range of $0.3 \leq \lambda \leq 1$. In each case, the optimal catalytic converter performance in pulse mode can be set for the specified reactor geometry when using the lambda modulation according to the invention. It is thus not limited to the specific embodiments shown.

The invention claimed is:

1. A method of controlling a reducing agent in an exhaust gas post-processing system of a combustion machine with an exhaust gas duct, in which an SCR catalytic converter is provided in the direction of flow of the exhaust, wherein a reducing agent generation system has an $NO_x$ and $CO/H_2$ generation unit, an oxidation catalytic converter and a combined $NO_x$ storage/ammonia generation unit in the standard gas route of the reducing agent generation system, the method comprising: adding ammonia as a reducing agent in front of the SCR catalytic converter by the reducing agent generation system in order to reduce nitrogen oxide and intermittently adding, at least source materials for the generation of ammonia to the $NO_x$ and $CO/H_2$ generation unit via a fuel supply line and via an air supply line, wherein a $CO/H_2$ reducing agent flow is temporally modulated with $\lambda<1$, during a temporally short, pulsed fat phase serving as a reduction phase for the $NO_x$ storage/ammonia generation unit, wherein, during the fat phase, the air/fuel composition before the oxidation catalytic converter is changed to the form of a lambda modulation for a lambda value, wherein the lambda value within the pulsed fat phase is held in a range or 0.33 through 0.45 and drops below this range for a short period of time at the beginning of the fat phase of the lambda value.

2. A method according to claim 1, wherein the lambda modulation within the fat phase is realized through a variation of the fuel volume flow at a constant air flow or through a variation of the air volume flow at a constant fuel volume or a combination of both variation options.

3. A method according to claim 1, wherein the lambda value drops to $\lambda \leq 0.3$ at the beginning of the fat phase.

4. A method according to claim 1, wherein the fat phase is preceded for a maximum of 1 second by a phase with a lower or higher lambda value with respect to the specified lambda value within the fat phase.

5. A method according to claim 1, wherein during the pulsed fat phase the lambda value is increased for the oxidation catalytic converter as needed in the range of $0.3 \leq \lambda \leq 1$.

6. A method according to claim 1, wherein within the pulsed fat phase the lambda value for the oxidation catalytic converter is increased at the end of the fat phase.

7. A method according to claim 1, wherein at least one of the beginning and end of the pulsed fat phase a rinsing of the oxidation catalytic converter is performed with air and/or, in the case of the operation with a separate burner, hot burner exhaust gas or a mixture of burner exhaust gas and air.

8. A method according to claim 1, wherein the pulsed operation of the oxidation catalytic converter includes a preliminary mixture formation during operation with a separate, external burner when the fuel is added to the hot burner exhaust gas or a mixture made up of burner exhaust and air or using a mixture made of burner exhaust gases and air during operation without an external burner when the fuel is added to otherwise preheated air.

9. A method according to claim 1, wherein a temporal modulation of the $CO/H_2$ reducing agent flow, the air volume flow and the fuel volume flow as well as the specification of the lambda value is realized by means of a control and regulation unit, wherein a corresponding valve control characteristic is provided for fuel-injection valves/injectors in the fuel duct as well as a corresponding performance characteristic for a air supply system for the air duct by means of hardware and software components.

10. A method according to claim 1, wherein the method is used in diesel engines or in lean engines, which have a reducing agent generation system.

11. A method of controlling a reducing agent in an exhaust gas post-processing system of a combustion machine with an exhaust gas duct, in which an SCR catalytic converter is provided in the direction of flow of the exhaust, wherein a reducing agent generation system has an $NO_x$ and $CO/H_2$ generation unit, an oxidation catalytic converter and a combined $NO_x$ storage / ammonia generation unit in the standard gas route of the reducing agent generation system, the method comprising: adding ammonia as a reducing agent in front of the SCR catalytic converter by the reducing agent generation system in order to reduce nitrogen oxide and intermittently adding, at least source materials for the generation of ammonia to the $NO_x$ and $CO/H_2$ generation unit via a fuel supply line and via an air supply line, wherein a $CO/H_2$ reducing agent flow is temporally modulated with $\lambda<1$, during a temporally short, pulsed fat phase serving as a reduction phase for the NOx storage/ammonia generation unit, wherein, during the fat phase, the air/fuel composition before the oxidation catalytic converter is changed to the form of a lambda modulation for a lambda value, wherein the lambda value within the pulsed fat phase is held in a range of 0.33 through 0.45 and is increased above this range for a short period of time at the beginning of the fat phase of the lambda value, wherein the lambda value is increased to a value in the range of $0.7 \leq \lambda \leq 0.9$ at the beginning of the fat phase.

* * * * *